(12) United States Patent
Morimoto et al.

(10) Patent No.: US 11,611,674 B2
(45) Date of Patent: Mar. 21, 2023

(54) IMAGE FORMING APPARATUS AND METHOD OF DETECTING RISE OF RECORDING MEDIUM

(71) Applicants: Hidemasa Morimoto, Tokyo (JP); Koichi Murota, Tokyo (JP); Masashi Hommi, Kanagawa (JP); Yuki Osato, Tokyo (JP); Yuusuke Tomura, Kanagawa (JP)

(72) Inventors: Hidemasa Morimoto, Tokyo (JP); Koichi Murota, Tokyo (JP); Masashi Hommi, Kanagawa (JP); Yuki Osato, Tokyo (JP); Yuusuke Tomura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 119 days.

(21) Appl. No.: 17/332,326

(22) Filed: May 27, 2021

(65) Prior Publication Data
US 2021/0405562 A1    Dec. 30, 2021

(30) Foreign Application Priority Data
Jun. 25, 2020    (JP) .............................. JP2020-109594

(51) Int. Cl.
     *H04N 1/04*      (2006.01)
     *H04N 1/00*      (2006.01)
     (Continued)

(52) U.S. Cl.
     CPC ..... *H04N 1/00726* (2013.01); *H04N 1/00798* (2013.01); *H04N 1/29* (2013.01);
     (Continued)

(58) Field of Classification Search
None
See application file for complete search history.

(56) References Cited

U.S. PATENT DOCUMENTS

| | | | |
|---|---|---|---|
| 5,808,756 A | * | 9/1998 | Matsuda ................ H04N 1/401 358/475 |
| 2006/0159468 A1 | | 7/2006 | Kouchi et al. |

(Continued)

FOREIGN PATENT DOCUMENTS

| | | |
|---|---|---|
| JP | 11-177771 | 7/1999 |
| JP | 2012-160896 | 8/2012 |
| JP | 2019-060984 | 4/2019 |

*Primary Examiner* — Dung D Tran
(74) *Attorney, Agent, or Firm* — Harness, Dickey & Pierce, P.L.C.

(57) ABSTRACT

An image forming apparatus includes a reading table, an image reading device, an image forming device with an exposure device, and circuitry. The reading device reads a pattern on a recording medium on the table, and generates image data of the pattern. The exposure device includes a light emitting element to form an electrostatic latent image, based on which the image forming device forms the pattern. Based on first and second correction values, the circuitry calculates a third correction value to correct a light amount of the light emitting element. The exposure device includes a driving device that drives the light emitting element based on the third correction value. The circuitry sets at least two or more determination areas in each of a white area and a pattern area of the medium, and determines whether the medium has a rise based on density data in the determination areas.

13 Claims, 9 Drawing Sheets

(51) Int. Cl.
*H04N 1/29* (2006.01)
*G03G 15/00* (2006.01)
*G03G 15/22* (2006.01)

(52) U.S. Cl.
CPC ............ *G03G 15/22* (2013.01); *G03G 15/50* (2013.01); *H04N 2201/0081* (2013.01); *H04N 2201/0082* (2013.01)

(56) References Cited

U.S. PATENT DOCUMENTS

| | | |
|---|---|---|
| 2006/0159469 A1 | 7/2006 | Furuichi et al. |
| 2008/0037077 A1* | 2/2008 | Higashi ............. H04N 1/00018 358/498 |
| 2009/0116062 A1 | 5/2009 | Aihara et al. |
| 2012/0069127 A1 | 3/2012 | Murota |
| 2012/0194630 A1 | 8/2012 | Murota |
| 2013/0163054 A1* | 6/2013 | Hayashide ......... H04N 1/00031 358/447 |
| 2015/0239263 A1* | 8/2015 | Ishizuka .................. B41J 3/407 347/16 |
| 2015/0261116 A1 | 9/2015 | Murota et al. |
| 2015/0261117 A1 | 9/2015 | Suzuki et al. |
| 2016/0136947 A1 | 5/2016 | Hommi |
| 2016/0347050 A1 | 12/2016 | Hommi |
| 2017/0270395 A1 | 9/2017 | Tanaka et al. |
| 2018/0356759 A1 | 12/2018 | Narita et al. |
| 2019/0094776 A1* | 3/2019 | Nishio ............... H04N 1/00779 |
| 2019/0196360 A1 | 6/2019 | Inokuchi et al. |
| 2019/0286005 A1 | 9/2019 | Nishina et al. |
| 2020/0033752 A1 | 1/2020 | Kubo et al. |
| 2020/0233361 A1 | 7/2020 | Hara et al. |
| 2020/0280651 A1 | 9/2020 | Tomura et al. |
| 2020/0283252 A1* | 9/2020 | Kiyose ..................... B65H 3/063 |
| 2020/0301357 A1 | 9/2020 | Hommi et al. |
| 2020/0333725 A1 | 10/2020 | Tomura et al. |
| 2021/0253387 A1* | 8/2021 | Funaki ..................... B65H 3/06 |

* cited by examiner

IMAGE FORMING APPARATUS AND METHOD OF DETECTING RISE OF RECORDING MEDIUM

CROSS-REFERENCE TO RELATED APPLICATION

This patent application is based on and claims priority pursuant to 35 U.S.C. § 119(a) to Japanese Patent Application No. 2020-109594 filed on Jun. 25, 2020 in the Japan Patent Office, the entire disclosure of which is hereby incorporated by reference herein.

BACKGROUND

Technical Field

The present invention relates to an image forming apparatus and a method of detecting rise of a recording medium.

Description of the Related Art

As a method of detecting a rise of a recording medium such as a paper sheet by using a reading device such as a scanner, there is a technique of detecting the rise of the recording medium by using the fact that the density is increased in image data read from a white area of the recording medium. There is also a technique of determining whether the recording medium is upside down or reversed based on the density in the image data of a particular area of the recording medium when the image data of the recording medium formed with a fixed pattern is read by a reading device such as a scanner.

According to the technique of detecting the rise of the recording medium by using the fact that the density is increased in the image data read from the white area of the recording medium, however, the rise of the recording medium is detected based on a single density threshold value. It is therefore difficult to detect the rise of the recording medium in an area of the recording medium other than the white area, i.e., in an area with a certain density. Further, according to the technique of determining whether the recording medium is upside down or reversed based on the density in the image data of the particular area of the recording medium, the determination of whether the recording medium is upside down or reversed may not be made when the rise occurring in the recording medium has a narrow width in the sub-scanning direction of the recording medium. It is therefore difficult to perform an appropriate process addressing the rise of the recording medium.

SUMMARY

In one embodiment of this invention, there is provided an improved image forming apparatus that includes, for example, a reading table, an image reading device, an image forming device, and circuitry. The image reading device reads a pattern formed on a recording medium on the reading table and generates image data of the pattern. The image forming device includes an exposure device. The exposure device includes a light emitting element that irradiates a surface of a photoconductor with light to form an electrostatic latent image on the surface of the photoconductor. The image forming device forms the pattern on the recording medium based on the electrostatic latent image. Based on a first correction value and a second correction value, the circuitry calculates a third correction value to correct a light amount of the light emitting element. The first correction value is previously set to correct the light amount of the light emitting element. The second correction value is calculated based on density data of the image data to correct the light amount of the light emitting element. The exposure device further includes an element driving device that drives the light emitting element in accordance with the third correction value. The circuitry sets at least two or more determination areas in each of a white area and a density acquisition pattern area of the recording medium. Prior to calculating the third correction value, the circuitry determines presence or absence of a rise of the recording medium from the reading table based on the density data of the image data in the at least two or more determination areas.

In one embodiment of this invention, there is provided an improved image forming apparatus that includes, for example, a reading table, image reading means, image forming means, and control means. The image reading means reads a pattern formed on a recording medium on the reading table and generates image data of the pattern. The image forming means forms the pattern on the recording medium based on an electrostatic latent image. The image forming means includes exposure means. The exposure means includes light emitting means for irradiating a surface of a photoconductor with light to form the electrostatic latent image on the surface of the photoconductor. Based on a first correction value and a second correction value, the control means calculates a third correction value to correct a light amount of the light emitting means. The first correction value is previously set to correct the light amount of the light emitting means. The second correction value is calculated based on density data of the image data to correct the light amount of the light emitting means. The exposure means further includes element driving means for driving the light emitting means in accordance with the third correction value. The control means sets at least two or more determination areas in each of a white area and a density acquisition pattern area of the recording medium. Prior to calculating the third correction value, the control means determines presence or absence of a rise of the recording medium from the reading table based on the density data of the image data in the at least two or more determination areas.

In one embodiment of this invention, there is provided a method performed by an image forming apparatus that includes a reading table and an exposure device. The exposure device includes a light emitting element. The method includes, for example, forming a pattern on a recording medium based on an electrostatic latent image with the exposure device, reading the pattern formed on the recording medium on the reading table and generating image data of the pattern, determining presence or absence of a rise of the recording medium from the reading table based on density data of the image data in at least two or more determination areas that have been set in each of a white area and a density acquisition pattern area of the recording medium, calculating a third correction value to correct a light amount of the light emitting element based on a first correction value previously set to correct the light amount of the light emitting element and a second correction value calculated based on the density data of the image data to correct the light amount of the light emitting element, and driving the light emitting element in accordance with the third correction value with the exposure device.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An embodiment of an image forming apparatus of the present invention will be described in detail below with reference to the accompanying drawings.

Figure 1:
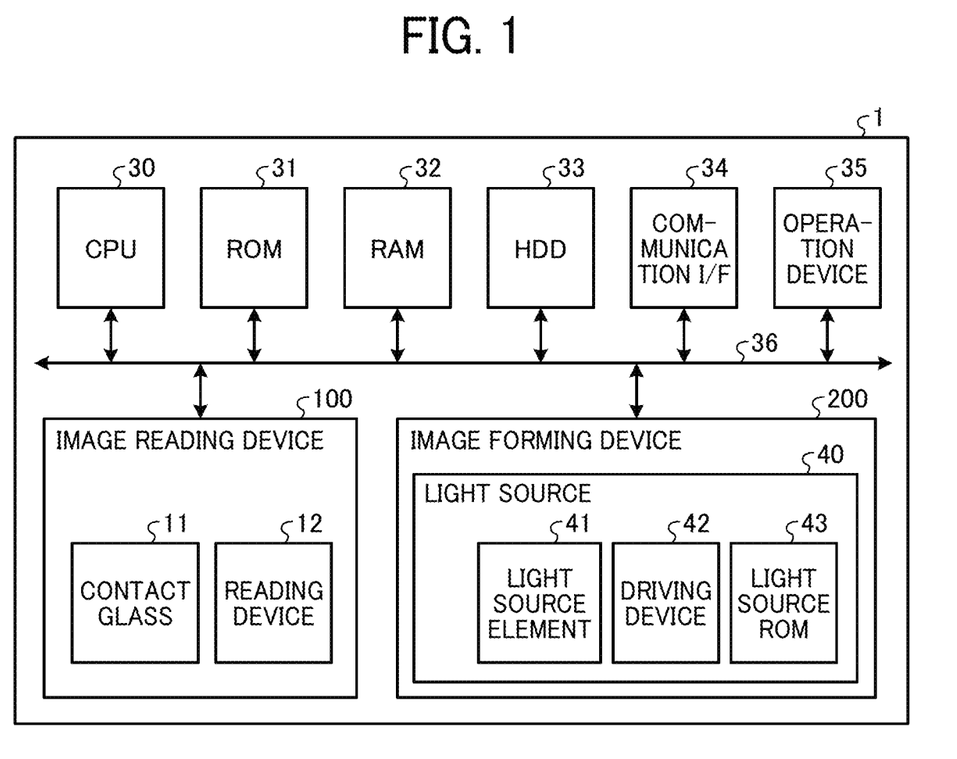
FIG. 1 is a schematic diagram illustrating an example of the hardware configuration of an image forming apparatus according to an embodiment of the present invention.

FIG. 1 is a schematic diagram illustrating an example of the hardware configuration of an image forming apparatus according to an embodiment of the present invention. As illustrated in FIG. 1, an image forming apparatus 1 includes at least a central processing unit (CPU) 30, a read only memory (ROM) 31, a random access memory (RAM) 32, a hard disk drive (HDD) 33, a communication interface (I/F) 34, an operation device 35, an image reading device 100, and an image forming device 200, which are connected to each other via a system bus 36.

The CPU 30 controls the operation of the image forming apparatus 1. The CPU 30 executes a program stored in the ROM 31 or the HDD 33 by using the RAM 32 as a work area. Thereby, the CPU 30 controls the overall operation of the image forming apparatus 1 to implement various functions such as a copier function, a scanner function, a facsimile (FAX) function, and a printer function. Each time an operation is performed by one of these various functions, the operation (hereinafter occasionally referred to as the job) is storable in the HDD 33 as an operation log of the image forming apparatus 1.

The communication I/F 34 is an interface that receives a job from an external apparatus via a well-known network and transmits a read image read and formed by the image reading device 100 to the outside of the image forming apparatus 1 via a well-known network.

The operation device 35 receives various inputs according to operations performed by an operator (hereinafter referred to as the user). The operation device 35 further displays various information such as information representing a received operation, information representing the operating status of the image forming apparatus 1, and information representing the setting status of the image forming apparatus 1, for example. The operation device 35 is implemented with, but not limited to, a liquid crystal display (LCD) equipped with a touch panel function, for example. For instance, the operation device 35 may be implemented with an organic electroluminescence (EL) display equipped with the touch panel function. In addition to or in place of the display, the operation device 35 may include an operation section including hardware keys and a display section including lamps.

The image reading device 100 includes a contact glass 11 and a reading device 12. The contact glass 11 is an example of a reading table on which a recording medium is placed. The recording medium is, for example, a sheet on which a pattern is formed by the image forming device 200. The reading device 12 is an example of an image reading device that reads the pattern formed on the recording medium placed on the contact glass 11 and generates image data of the pattern.

The image forming device 200 includes a photoconductor drum (an example of a photoconductor), a charging device, an exposure device, a developing device, a transfer device, and a fixing device. The image forming device 200 forms a pattern on the recording medium. The charging device charges a surface of the photoconductor drum. The exposure device irradiates the charged surface of the photoconductor drum with light to form thereon an electrostatic latent image.

Specifically, the exposure device includes a light source 40 that includes a light source element 41, a driving device 42, and a light source ROM 43. The light source element 41 is a light emitting diode (LED) array head or a laser diode (LD) unit, for example. The light source element 41 is an example of a light emitting element that irradiates the surface of the photoconductor drum with irradiation light corresponding to the pattern to be formed on the recording medium, to thereby form an electrostatic latent image on the surface of the photoconductor drum. The driving device 42 is implemented with a driver integrated circuit (IC), for example. The driving device 42 drives the light source element 41 to turn on based on the image data. Specifically, the driving device 42 is an example of an element driving device that reads a correction value (i.e., a later-described third correction value) from the light source ROM 43 and drives the light source element 41 in accordance with the correction value. The light source ROM 43 is an example of a memory that stores information and settings for the driving device 42 to drive the light source element 41, such as the correction value for correcting the light amount of the light source element 41 (e.g., a correction value for correcting the drive current or the driving time of the light source element 41).

The developing device adheres toner to the electrostatic latent image formed on the surface of the photoconductor drum, to thereby form a toner image on the surface of the photoconductor drum. The transfer device transfers the toner image formed on the surface of the photoconductor drum to the recording medium. The fixing device fixes the toner image on the recording medium.

An example of the functional configuration of the image forming apparatus 1 of the embodiment will be described with FIG. 2.

Figure 2:
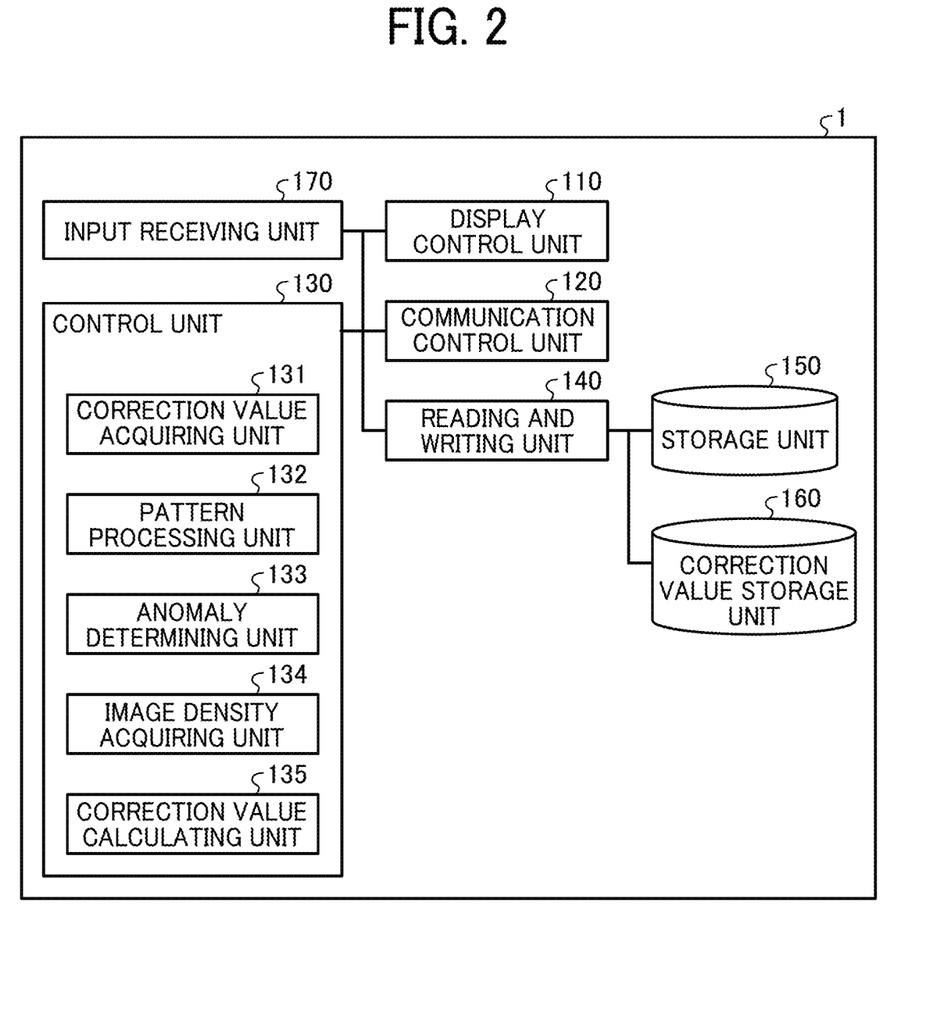
FIG. 2 is a block diagram illustrating an example of the functional configuration of the image forming apparatus of the embodiment.

FIG. 2 is a block diagram illustrating an example of the functional configuration of the image forming apparatus 1 of the embodiment. The image forming apparatus 1 includes a display control unit 110, a communication control unit 120, a control unit 130, a reading and writing unit 140, a storage unit 150, a correction value storage unit 160, and an input receiving unit 170.

The display control unit 110 is implemented when the CPU 30 executes the program stored in the ROM 31 or the HDD 33 by using the RAM 32 as a work area. The display control unit 110 executes a function of controlling a display screen displayed on the input receiving unit 170. In the present embodiment, when the control unit 130 detects an anomaly such as a rise of the recording medium on the contact glass 11, the display control unit 110 notifies the anomaly.

The communication control unit 120 is implemented by the processing of the communication I/F 34. The communication control unit 120 transmits image information to the outside of the image forming apparatus 1. If it is possible to set various setting information from an external apparatus, the communication control unit 120 executes a function of communicating with the external apparatus via a network.

The control unit 130 is implemented when the CPU 30 executes the program stored in the ROM 31 or the HDD 33 by using the RAM 32 as a work area. The control unit 130 executes the functions of the image forming apparatus 1 as a whole, such as the copier function, the scanner function, the printer function, and the FAX function, for example.

In the present embodiment, the control unit 130 includes a correction value acquiring unit 131, a pattern processing unit 132, an anomaly determining unit 133, an image density acquiring unit 134, and a correction value calculating unit 135.

The correction value acquiring unit 131 acquires, from the correction value storage unit 160, a first correction value for correcting the light amount of the light source element 41. Herein, the first correction value is a correction value previously set to correct the light amount of the light source element 41, such as a correction value for correcting the drive current or the driving time of the light source element 41.

The pattern processing unit 132 sets at least two or more determination areas for each of a white area and a density acquisition pattern area of the recording medium. In the present embodiment, the pattern processing unit 132 sets the determination areas in at least one edge portion of the recording medium. It is assumed in the present embodiment that the location coordinates of the determination areas in the recording medium are stored in the storage unit 150, and that the location coordinates are previously set. The pattern processing unit 132 therefore sets the determination areas based on the location coordinates stored in the storage unit 150. Further, in the present embodiment, the pattern processing unit 132 controls the image forming device 200 to move the position of the density acquisition pattern area formed on the recording medium.

The image density acquiring unit 134 acquires the density data (e.g., the mean density) of the image data corresponding to each of the determination areas set in the recording medium. Based on the density data of the image data generated by the image reading device 100, the correction value calculating unit 135 calculates a second correction value (e.g., a correction value for correcting the drive current or the driving time of the light source element 41) for correcting the light amount of the light source element 41. Then, based on the first correction value acquired by the correction value acquiring unit 131 and the above-calculated second correction value, the correction value calculating unit 135 calculates a third correction value (e.g., a correction value for correcting the drive current or the driving time of the light source element 41) for correcting the light amount of the light source element 41. The correction value calculating unit 135 then stores the third correction value in the correction value storage unit 160.

Figure 4:
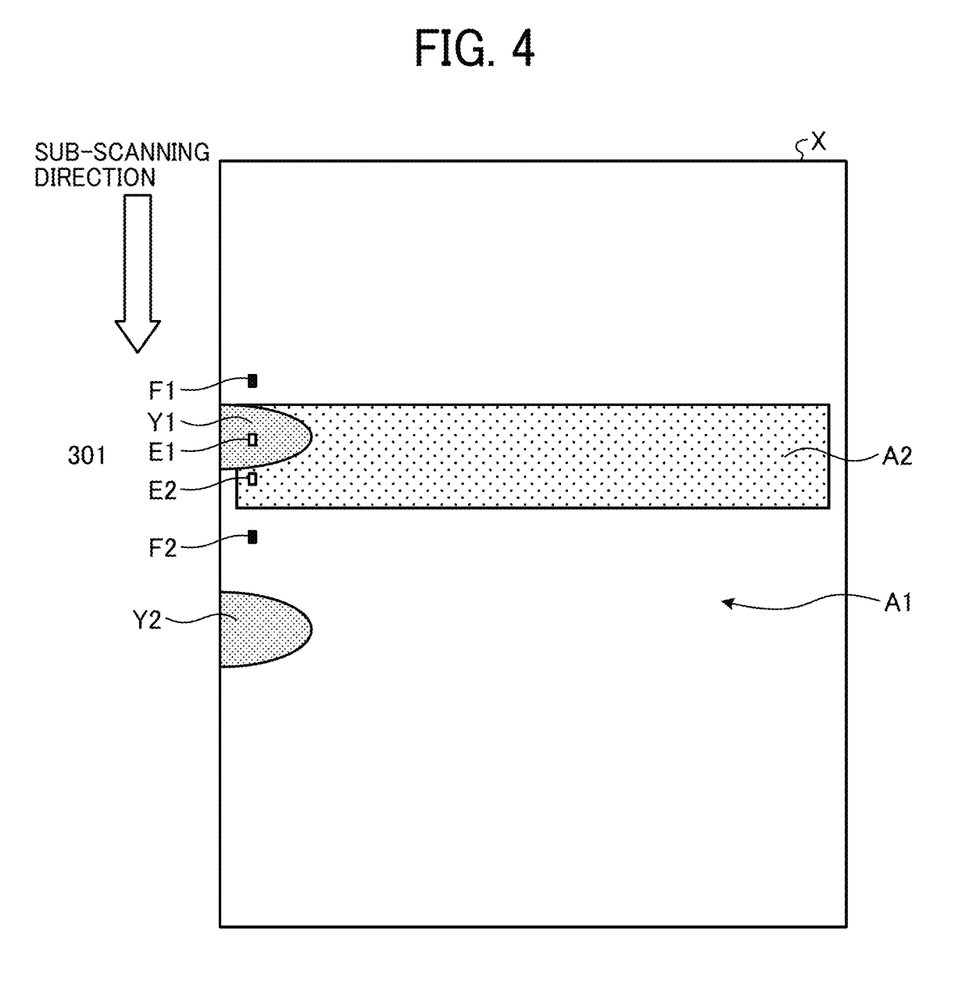
FIG. 4 is a diagram illustrating an example of a process performed in the image forming apparatus of the embodiment to determine the presence or absence of the rise of the recording medium.

Before the correction value calculating unit 135 calculates the third correction value, the anomaly determining unit 133 determines the presence or absence of the rise of the recording medium on the contact glass 11 based on the density data of the determination areas acquired by the image density acquiring unit 134. As illustrated in FIG. 4, therefore, the presence or absence of rises Y1 and Y2 is determined even in a density acquisition pattern area A2 of a recording medium X or even if the rises Y1 and Y2 have a narrow width in the sub-scanning direction of the recording medium X. Consequently, the recording medium X is rearranged or pressed with a weight by the user to prevent erroneous density correction due to the rises Y1 and Y2 of the recording medium X.

The reading and writing unit 140 is implemented when the CPU 30 executes the program stored in the ROM 31 or the HDD 33 by using the RAM 32 as a work area. The reading and writing unit 140 executes a function of storing various data in the storage unit 150 or the correction value storage unit 160 and a function of reading the stored various data.

The storage unit 150 is implemented by the processing of the ROM 31 or the HDD 33 to execute a function of storing programs, document data, various setting information for the image forming apparatus 1 to operate, and operation logs of the image forming apparatus 1, for example. The storage unit 150 may be implemented by a temporary storage function of the RAM 32.

The correction value storage unit 160 is implemented by the processing of the light source ROM 43 to execute a function of storing various information and settings used to drive the light source element 41. In the present embodiment, the correction value storage unit 160 is implemented by the light source ROM 43. The correction value storage unit 160, however, is not limited to the light source ROM 43, and may be implemented by a memory such as the HDD 33, for example.

The input receiving unit 170 is implemented by the processing of the operation device 35 to execute a function of displaying information for the user to perform an operation and a function of receiving various inputs from the user.

An example of an issue of a process performed in a related-art image forming apparatus to determine the presence or absence of the rise of the recording medium X will be described with FIG. 3.

Figure 3:
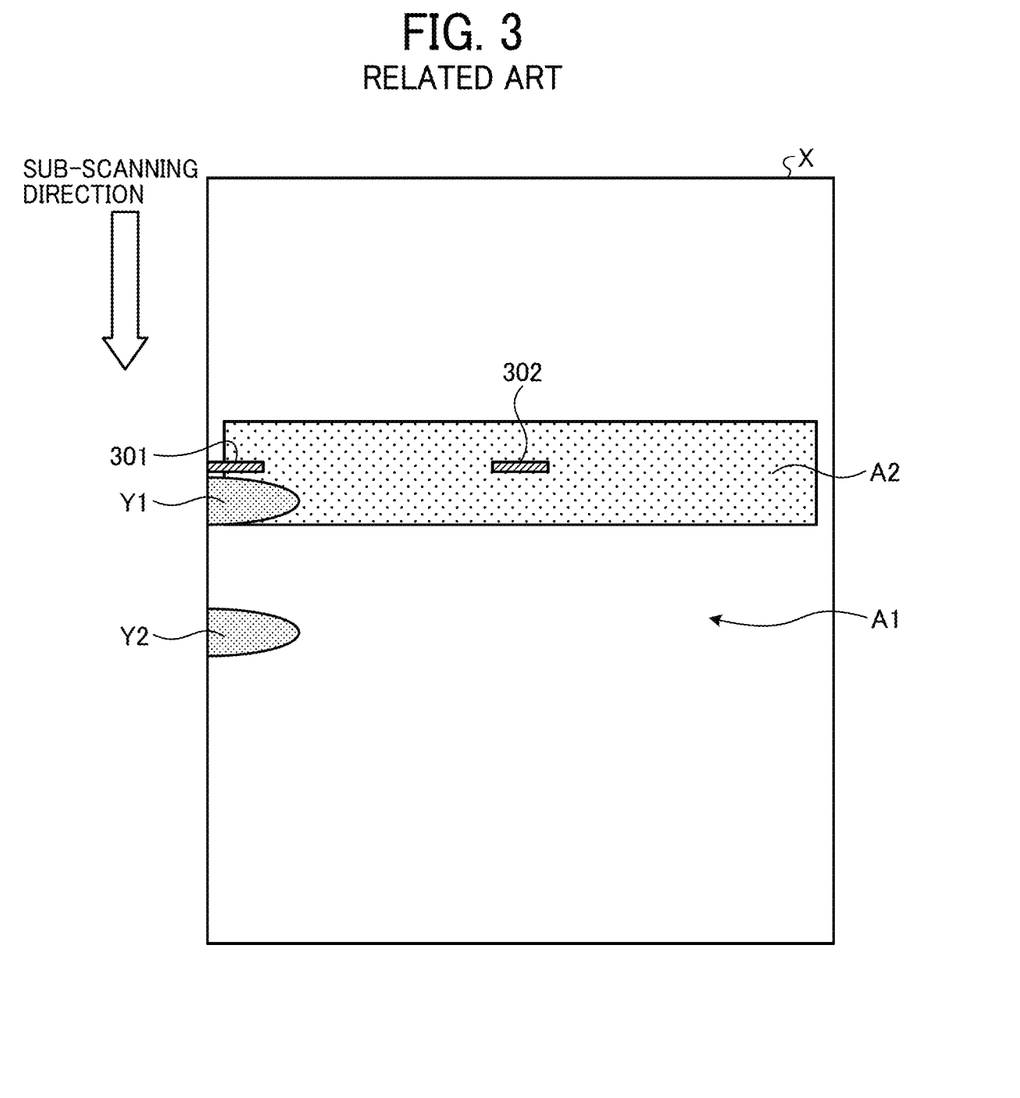
FIG. 3 is a diagram illustrating an example of an issue of a process performed in a related-art image forming apparatus to determine the presence or absence of a rise of a recording medium.

FIG. 3 is a diagram illustrating an example of an issue of a process performed in a related-art image forming apparatus to determine the presence or absence of the rise of the recording medium X. As a method of detecting the rise of the recording medium X by using a reading device such as a scanner, there is a technique of detecting the rise of the recording medium X by using the fact that the density is increased in the image data read from a white area A1 of the recording medium X. Immediately after the image of an output pattern formed on the recording medium X is fixed thereon, edge portions of the recording medium X are likely to bend. In the reading of the recording medium X placed on the contact glass 11, therefore, the edge portions of the recording medium X is bent. In the present embodiment, this bend of the recording medium X will be described as the rise of the recording medium X from the contact glass 11. According to the above-described technique, the rise of the recording medium X is detected based on a single density threshold value. It is therefore difficult to detect the rise of the recording medium X in the density acquisition pattern area A2 (i.e., an area with a certain density) other than the white area A1.

According to another related-art technique, whether the recording medium X is upside down or reversed is determined based on the density of the image data corresponding to determination areas 301 and 302 in the density acquisition pattern area A2 of the recording medium X when the image data of the recording medium X formed with a fixed pattern is read by a reading device. According to this technique, however, if the rises Y1 and Y2 with a narrow width in the sub-scanning direction of the recording medium X occur in the recording medium X, the rises Y1 and Y2 may not be included in the determination area 301 or 302 for determining whether the recording medium X is upside down or reversed, as illustrated in FIG. 3. In this case, the rises Y1 and Y2 of the recording medium X are not detected. According to this technique, therefore, it difficult to perform an appropriate density correction process when the recording medium X has the rises Y1 and Y2.

An example of a process performed in the image forming apparatus 1 of the embodiment to determine the presence or absence of the rise of the recording medium X will be described with FIG. 4.

FIG. 4 is a diagram illustrating an example of a process performed in the image forming apparatus 1 of the embodiment to determine the presence or absence of the rise of the recording medium X. In the image forming apparatus 1 of the embodiment, at least two or more determination areas are set in each of the white area A1 and the density acquisition pattern area A2 of the recording medium X. For example, determination areas E1 and E2 are set in the density acquisition pattern area A2, and determination areas F1 and F2 are set in the white area A1, as illustrated in FIG. 4. In the present embodiment, the pattern processing unit 132 sets the determination areas E1, E2, F1 and F2 in the recording medium X along the sub-scanning direction, as illustrated in FIG. 4. In this setting, the interval between each adjacent two of the determination areas is preferably set to enable the detection of the rises Y1 and Y2 of the recording medium X even if the rises Y1 and Y2 have a narrow width in the sub-scanning direction of the recording medium X.

Before the correction value calculating unit 135 calculates the third correction value, the anomaly determining unit 133 determines the presence or absence of the rise of the recording medium X from the contact glass 11 based on the density data of the image data corresponding to the determination areas, which is included in the density data of the image data generated by the image reading device 100. Thereby, the presence or absence of the rises Y1 and Y2 of the recording medium X is determined even in the density acquisition pattern area A2 or even if the rises Y1 and Y2 have a narrow width in the sub-scanning direction of the recording medium X. Consequently, the recording medium X is rearranged or pressed with a weight by the user to prevent the erroneous density correction due to the rises Y1 and Y2 of the recording medium X.

Figure 5:
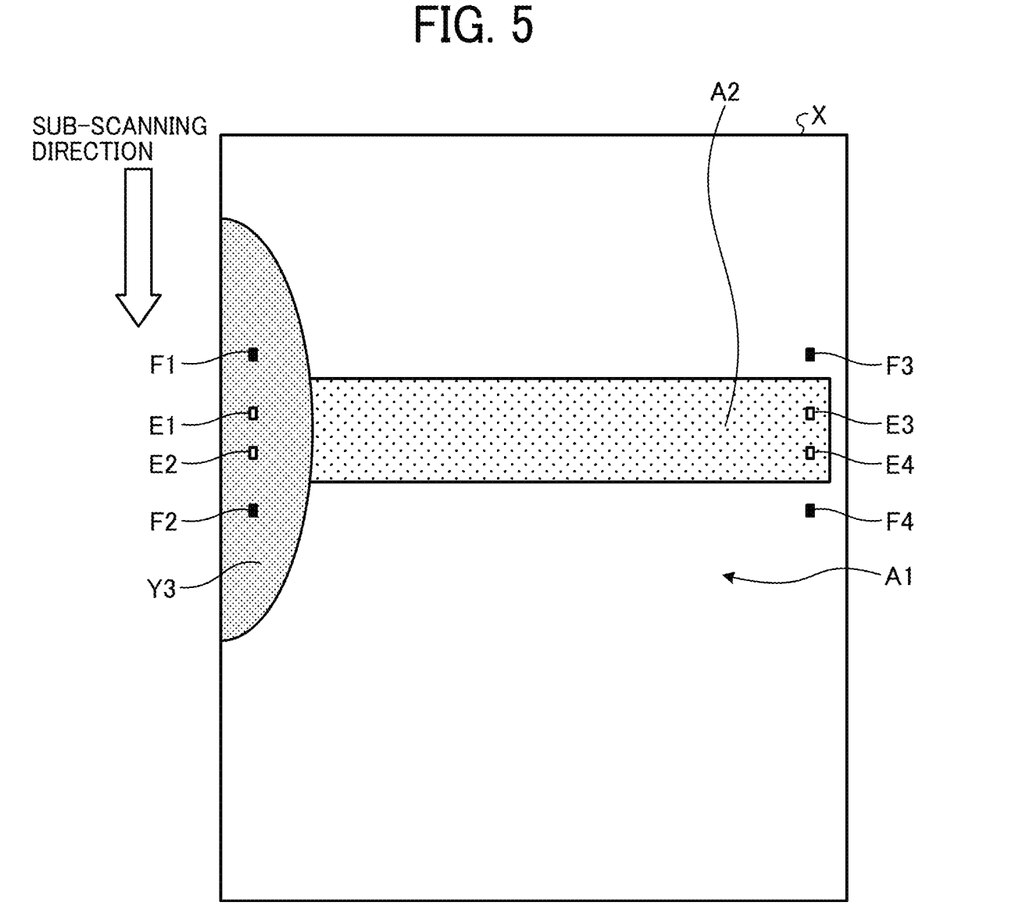
FIG. 5 is a diagram illustrating an example of a method performed in the image forming apparatus of the embodiment to set determination areas.

A description will be given of an example of a method performed in the image forming apparatus 1 of the embodiment to set the determination areas.

FIG. 5 is a diagram illustrating an example of a method performed in the image forming apparatus 1 of the embodiment to set the determination areas. In the example illustrated in FIG. 4, the pattern processing unit 132 sets the two determination areas E1 and E2 in the density acquisition pattern area A2 and the two determination areas F1 and F2 in the white area A1 in one of two opposing edge portions of the recording medium X in the width direction of the recording medium X (i.e., in the main scanning direction perpendicular to the sub-scanning direction of the recording medium X). The pattern processing unit 132 may also set two determination areas E3 and E4 in the density acquisition pattern area A2 and two determination areas F3 and F4 in the white area A1 in the other edge portion of the recording medium X in the width direction of the recording medium X, as illustrated in FIG. 5.

That is, the pattern processing unit 132 may set two of the determination areas E1 to E4 in the density acquisition pattern area A2 in each of the two opposing edge portions of the recording medium X in the width direction of the recording medium X, and may set two of the determination areas F1 to F4 in the white area A1 in each of the two opposing edge portions of the recording medium X in the width direction of the recording medium X. Particularly when setting the four determination areas E1 to E4 or more in the density acquisition pattern area A2, the pattern processing unit 132 sets at least two of the four determination areas E1 to E4 or more in the density acquisition pattern area A2 in each of the two opposing edge portions of the recording medium X.

As illustrated in FIG. 5, the determination areas E1, E2, F1, and F2 in one of the two opposing edge portions of the recording medium X in the width direction thereof may be included in a rise Y3 of the recording medium X. In this case, it is difficult to determine the presence or absence of the rise Y3 based on the density data of the image data corresponding to the determination areas E1, E2, F1, and F2. Even in this case, however, the presence or absence of the rise Y3 is determined with the density data of the image data corresponding to the determination areas E1 to E4 and F1 to F4 in the two opposing edge portions of the recording medium X in the width direction thereof. Consequently, erroneous density correction due to the rise Y3 is effectively prevented.

Figure 6:
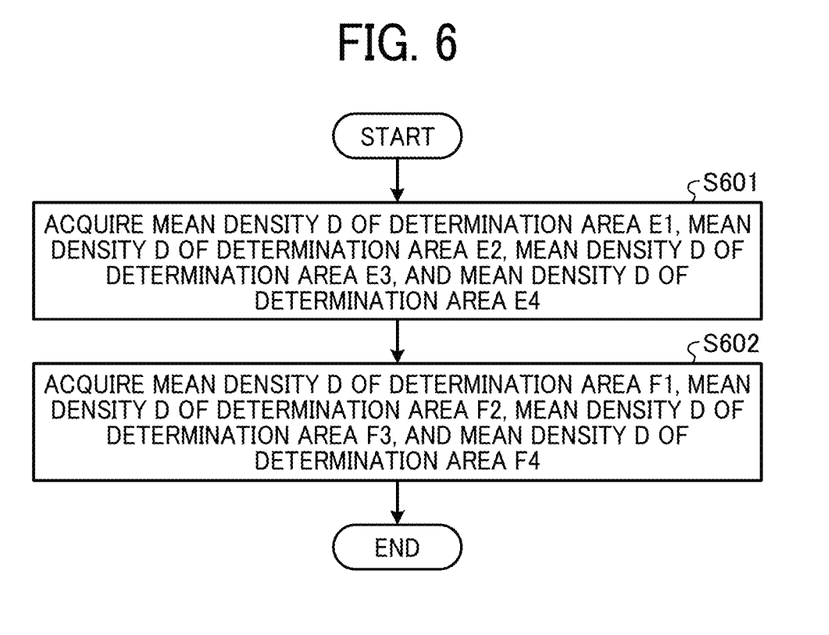
FIG. 6 is a flowchart illustrating an example of the procedure of a process performed in the image forming apparatus of the embodiment to acquire density data of the determination areas.

A description will be given of an example of the procedure of a process performed in the image forming apparatus 1 of the embodiment to acquire the density data of the image data corresponding to the determination areas E1 to E4 and F1 to F4.

FIG. 6 is a flowchart illustrating an example of the procedure of a process performed in the image forming apparatus 1 of the embodiment to acquire the density data of the determination areas E1 to E4 and F1 to F4. The image density acquiring unit 134 first acquires a mean density D of each of the determination areas E1 to E4 in the recording medium X as the density data of the image data corresponding to the determination areas E1 to E4 (step S601). The image density acquiring unit 134 then acquires the mean density D of each of the determination areas F1 to F4 in the recording medium X as the density data of the image data corresponding to the determination areas F1 to F4 (step S602).

In the density data acquisition process illustrated in FIG. 6, the image density acquiring unit 134 acquires the mean density D of the image data for each of the determination areas E1 to E4 and F1 to F4 in the two opposing edge portions of the recording medium X in the width direction thereof. If the determination areas set in the recording medium X are limited to the determination areas E1, E2, F1, and F2 in one of the two opposing edge portions of the recording medium X in the width direction thereof, the mean densities D of the image data acquired by the image density acquiring unit 134 are limited to those of the determination areas E1, E2, F1, and F2 in the one edge portion of the recording medium X.

Figure 7:
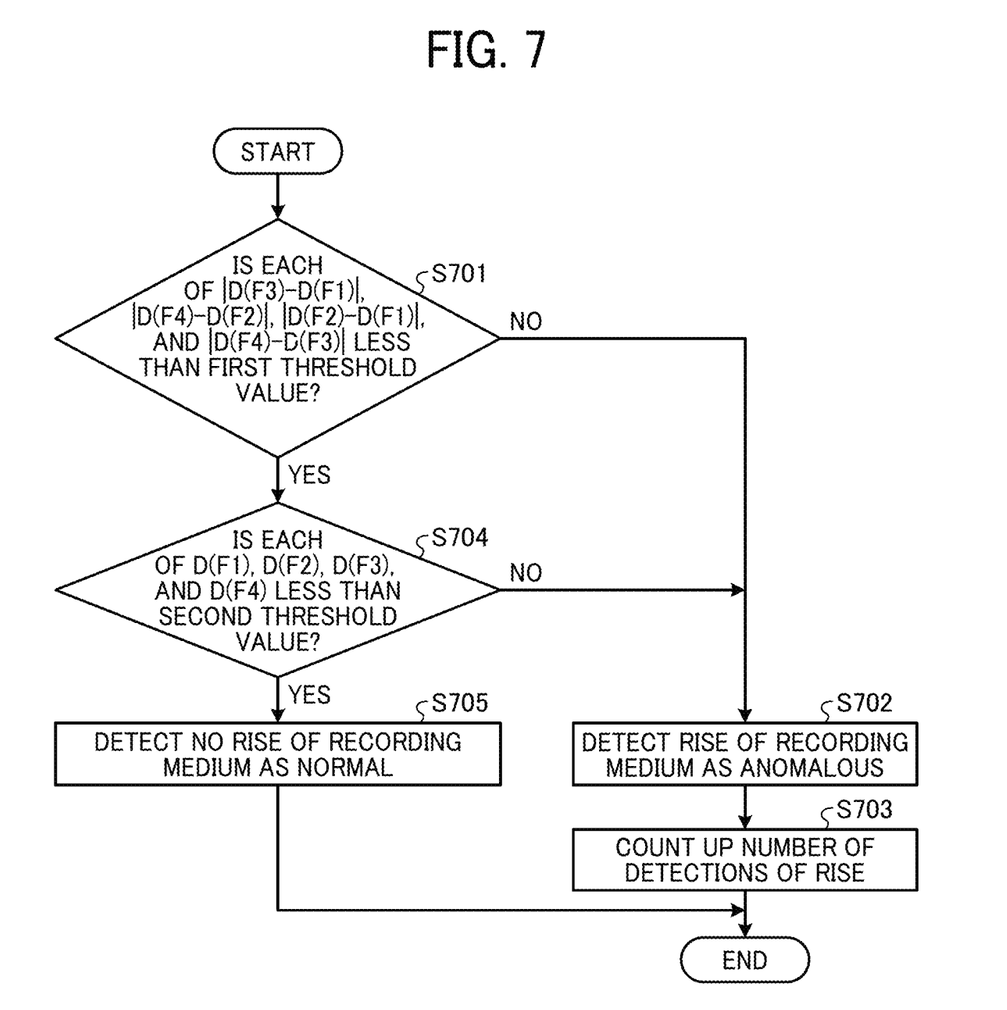
FIG. 7 is a flowchart illustrating an example of the procedure of a process performed in the image forming apparatus of the embodiment to determine the presence or absence of the rise of the recording medium in a white area of the recording medium.

A description will be given of an example of the procedure of a process performed in the image forming apparatus 1 of the embodiment to determine the presence or absence of the rise of the recording medium X in the white area A1.

FIG. 7 is a flowchart illustrating an example of the procedure of a process performed in the image forming apparatus 1 of the embodiment to determine the presence or absence of the rise of the recording medium X in the white area A1. With the respective mean densities D (i.e., the density data) of the determination areas F1 to F4 set in the white area A1 of the recording medium X, the anomaly determining unit 133 calculates the difference between the mean density D of the determination area F1 and the mean density D of the determination area F3 and the difference between the mean density D of the determination area F2 and the mean density D of the determination area F4. That is, with the respective mean densities D of the determination areas F1 to F4 set in the white area A1, the anomaly determining unit 133 calculates the difference in the mean density D between each two determination areas situated at the same position in the sub-scanning direction of the recording medium X (an example of a plurality of determination areas in the white area A1).

Further, with the respective mean densities D (i.e., the density data) of the determination areas F1 to F4 set in the white area A1 of the recording medium X, the anomaly determining unit 133 calculates the difference between the mean density D of the determination area F1 and the mean density D of the determination area F2 and the difference between the mean density D of the determination area F3 and the mean density D of the determination area F4. That is, with the respective mean densities D of the determination areas F1 to F4 set in the white area A1, the anomaly determining unit 133 calculates the difference in the mean density D between each two determination areas situated at the same position in the main scanning direction of the recording medium X (an example of a plurality of determination areas in the white area A1).

The anomaly determining unit 133 then determines whether each of the absolute value of the difference between the mean density D of the determination area F1 and the mean density D of the determination area F3, the absolute value of the difference between the mean density D of the determination area F2 and the mean density D of the determination area F4, the absolute value of the difference between the mean density D of the determination area F1 and the mean density D of the determination area F2, and the absolute value of the difference between the mean density D of the determination area F3 and the mean density D of the determination area F4 is less than a first threshold value (step S701). It is assumed here that the anomaly determining unit 133 determines, based on previously designed density data of the white area A1, whether each of the absolute values of the differences in the mean density D between the determination areas F1 to F4 in the white area A1 is within a designed range, and that the anomaly determining unit 133 sets the first threshold value based on the result of the determination.

Then, if at least one of the absolute value of the difference between the mean density D of the determination area F1 and the mean density D of the determination area F3, the absolute value of the difference between the mean density D of the determination area F2 and the mean density D of the determination area F4, the absolute value of the difference between the mean density D of the determination area F1 and the mean density D of the determination area F2, and the absolute value of the difference between the mean density D of the determination area F3 and the mean density D of the determination area F4 is equal to or greater than the first threshold value (NO at step S701), the anomaly determining unit 133 detects the rise of the recording medium X from the contact glass 11 and determines an anomaly in the recording medium X (step S702). The anomaly determining unit 133 further counts up the number of detections of the rise of the recording medium X (step S703). In response to the determination of an anomaly in the recording medium X, the display control unit 110 displays a message notifying that there is an anomaly in the recording medium X (i.e., the rise of the recording medium X).

If each of the absolute value of the difference between the mean density D of the determination area F1 and the mean density D of the determination area F3, the absolute value of the difference between the mean density D of the determination area F2 and the mean density D of the determination area F4, the absolute value of the difference between the mean density D of the determination area F1 and the mean density D of the determination area F2, and the absolute value of the difference between the mean density D of the determination area F3 and the mean density D of the determination area F4 is less than the first threshold value (YES at step S701), on the other hand, the anomaly determining unit 133 determines whether each of the mean densities D of the determination areas F1 to F4 is less than a second threshold value (step S704). It is assumed here that the anomaly determining unit 133 determines, based on previously designed density data of the white area A1, whether each of the mean densities D of the determination areas F1 to F4 in the white area A1 is within a designed range, and that the anomaly determining unit 133 sets the second threshold value based on the result of the determination.

If at least one of the mean densities D of the determination areas F1 to F4 is equal to or greater than the second threshold value (NO at step S704), the anomaly determining unit 133 detects the rise of the recording medium X from the contact glass 11 (i.e., an anomaly in the recording medium X) (step S702). The anomaly determining unit 133 further counts up the number of detections of the rise of the recording medium X (step S703). If each of the mean densities D of the determination areas F1 to F4 is less than the second threshold value (YES at step S704), the anomaly determining unit 133 determines that there is no rise of the recording medium X in the white area A1, i.e., that the recording medium X is in the normal state (step S705). The anomaly determining unit 133 then proceeds to the process of determining the presence or absence of the rise of the recording medium X in the density acquisition pattern area A2.

That is, the anomaly determining unit 133 determines the presence or absence of the rise of the recording medium X from the contact glass 11 based on the result of comparison between the first threshold value and each of the absolute values of the differences in the density data between the plurality of determination areas in the white area A1 and the result of comparison between the second threshold value and the density data of each of the plurality of determination areas in the white area A1.

Figure 8:
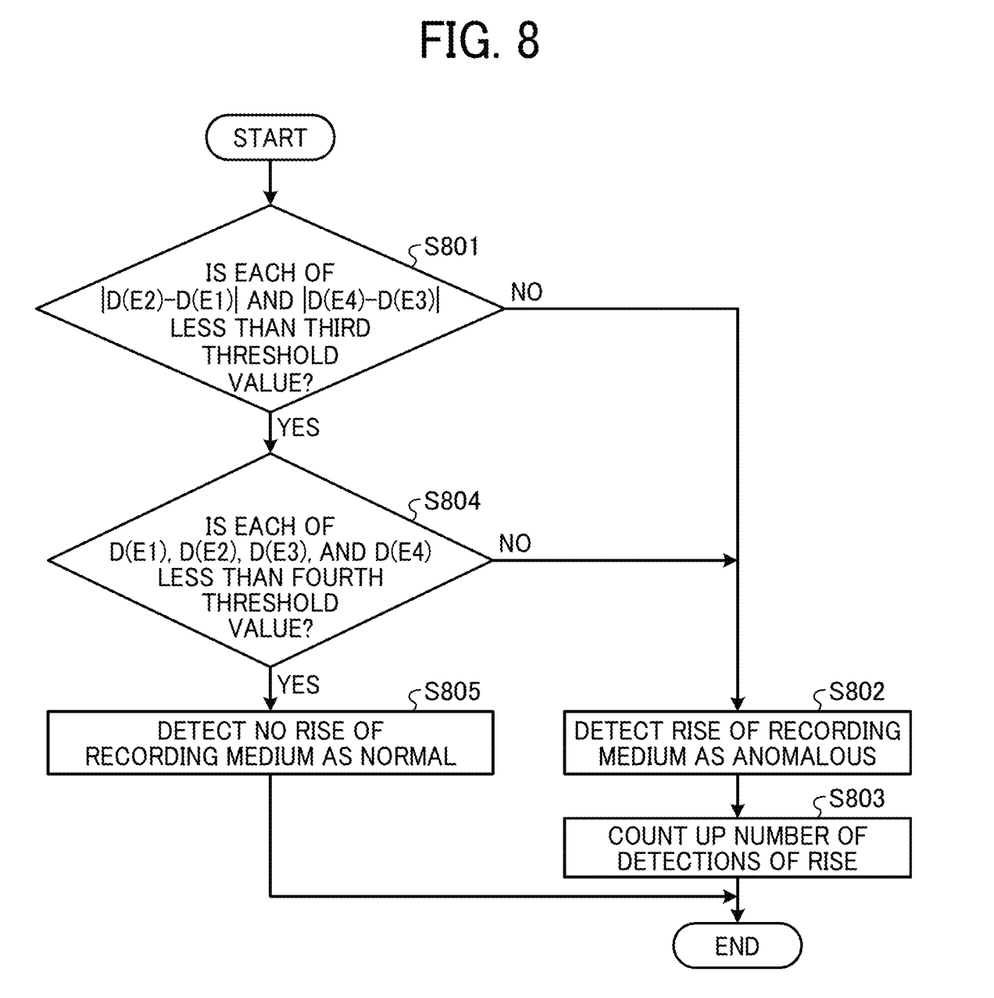
FIG. 8 is a flowchart illustrating an example of the procedure of a process performed in the image forming apparatus of the embodiment to determine the presence or absence of the rise of the recording medium in a density acquisition pattern area of the recording medium.

A description will be given of an example of the procedure of a process performed in the image forming apparatus 1 of the embodiment to determine the presence or absence of the rise of the recording medium X in the density acquisition pattern area A2.

FIG. 8 is a flowchart illustrating an example of the procedure of a process performed in the image forming apparatus 1 of the embodiment to determine the presence or absence of the rise of the recording medium X in the density acquisition pattern area A2. With the respective mean densities D (i.e., the density data) of the determination areas E1 to E4 set in the density acquisition pattern area A2 of the recording medium X, the anomaly determining unit 133 calculates the difference between the mean density D of the determination area E1 and the mean density D of the determination area E2 and the difference between the mean density D of the determination area E3 and the mean density D of the determination area E4. That is, with the respective mean densities D of the determination areas E1 to E4 set in the density acquisition pattern area A2, the anomaly determining unit 133 calculates the difference in the mean density D between each two determination areas situated at the same position in the main scanning direction of the recording medium X (an example of a plurality of determination areas in the density acquisition pattern area A2).

The anomaly determining unit 133 then determines whether each of the absolute value of the difference between the mean density D of the determination area E1 and the mean density D of the determination area E2 and the absolute value of the difference between the mean density D of the determination area E3 and the mean density D of the determination area E4 is less than a third threshold value (step S801). It is assumed here that the anomaly determining unit 133 determines, based on previously designed density data of the density acquisition pattern area A2, whether each of the absolute values of the differences in the mean density D between the determination areas E1 to E4 in the density acquisition pattern area A2 is within a designed range, and that the anomaly determining unit 133 sets the third threshold value based on the result of the determination.

If at least one of the absolute value of the difference between the mean density D of the determination area E1 and the mean density D of the determination area E2 and the absolute value of the difference between the mean density D of the determination area E3 and the mean density D of the determination area E4 is equal to or greater than the third threshold value (NO at step S801), the anomaly determining unit 133 detects the rise of the recording medium X from the contact glass 11 and determines an anomaly in the recording medium X (step S802). The anomaly determining unit 133 further counts up the number of detections of the rise of the recording medium X (step S803).

If each of the absolute value of the difference between the mean density D of the determination area E1 and the mean density D of the determination area E2 and the absolute value of the difference between the mean density D of the determination area E3 and the mean density D of the determination area E4 is less than the third threshold value (YES at step S801), the anomaly determining unit 133 determines whether each of the mean densities D of the determination areas E1 to E4 is less than a fourth threshold value (step S804). It is assumed here that the anomaly determining unit 133 determines, based on previously designed density data of the density acquisition pattern area A2, whether each of the mean densities D of the determination areas E1 to E4 in the density acquisition pattern area A2 is within a designed range, and that the anomaly determining unit 133 sets the fourth threshold value based on the result of the determination.

If at least one of the mean densities D of the determination areas E1 to E4 is equal to or greater than the fourth threshold value (NO at step S804), the anomaly determining unit 133 detects the rise of the recording medium X from the contact glass 11 (i.e., an anomaly in the recording medium X) (step S802). The anomaly determining unit 133 further counts up the number of detections of the rise of the recording medium X (step S803). If each of the mean densities D of the determination areas E1 to E4 is less than the fourth threshold value (YES at step S804), the anomaly determining unit 133 determines that there is no rise of the recording medium X in the density acquisition pattern area A2, i.e., that the recording medium X is in the normal state (step S805).

That is, the anomaly determining unit 133 determines the presence or absence of the rise of the recording medium X from the contact glass 11 based on the result of comparison between the third threshold value and each of the absolute values of the differences in the density data between the plurality of determination areas in the density acquisition pattern area A2 and the result of comparison between the fourth threshold value and the density data of each of the plurality of determination areas in the density acquisition pattern area A2.

An example of a determination area setting process of the embodiment will be described with FIG. 9.

Figure 9:
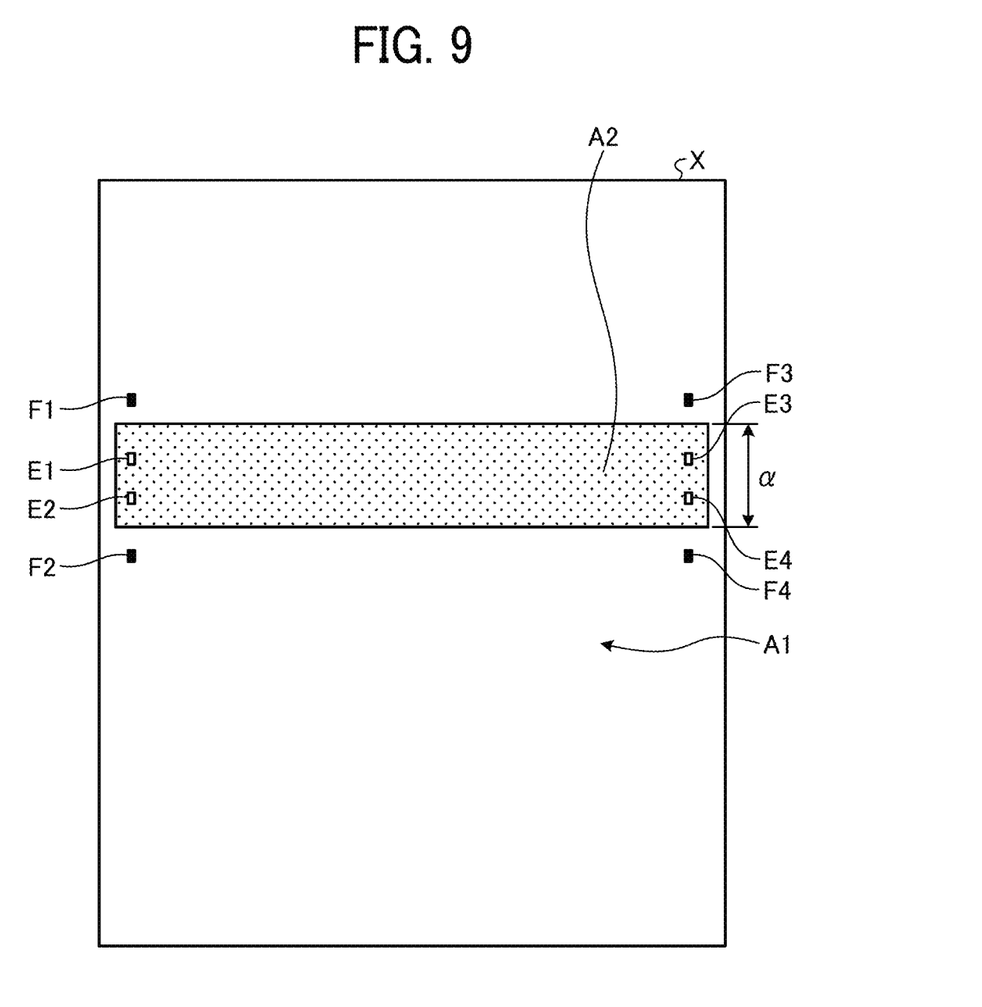
FIG. 9 is a diagram illustrating an example of a process performed in the image forming apparatus of the embodiment to set the determination areas.

FIG. 9 is a diagram illustrating an example of a process performed in the image forming apparatus 1 of the embodiment to set the determination areas. In the present embodiment, with an increase in a width α in the sub-scanning direction of the density acquisition pattern area A2 of the recording medium X when at least four determination areas E1 to E4 are set in the density acquisition pattern area A2, as illustrated in FIG. 9, the pattern processing unit 132 adds two determination areas, at a time, to the density acquisition pattern area A2 in addition to the four determination areas E1 to E4. That is, the pattern processing unit 132 sets the 4+2n determination areas in the density acquisition pattern area A2 (n represents an integer equal to or greater than zero).

Even with the increase in the width a in the sub-scanning direction of the density acquisition pattern area A2, therefore, the increase in the interval between adjacent two of the determination areas in the density acquisition pattern area A2 is prevented, thereby preventing erroneous determination of the presence or absence of the rises Y1 and Y2 with a narrow width in the sub-scanning direction of the recording medium X. Consequently, the recording medium X is rearranged or pressed with a weight by the user to more effectively prevent the erroneous density correction due to the rises Y1 and Y2 of the recording medium X.

As described above, the image forming apparatus 1 of the embodiment is capable of determining the presence or absence of the rises Y1 and Y2 of the recording medium X even in the density acquisition pattern area A2 or even if the rises Y1 and Y2 has a narrow width in the sub-scanning direction of the recording medium X. Consequently, the recording medium X is rearranged or pressed with a weight by the user to prevent the erroneous density correction due to the rises Y1 and Y2 of the recording medium X.

The program executed in the image forming apparatus 1 of the embodiment is provided as stored in a memory such as the ROM 31. Alternatively, the program executed in the image forming apparatus 1 of the embodiment may be provided as recorded on a computer readable recording medium, such as a compact disc (CD)-ROM, a flexible disc (FD), a CD-recordable (R), or a digital versatile disk (DVD), in an installable or executable file format.

Further, the program executed in the image forming apparatus 1 of the embodiment may be stored in a computer connected to a network such as the Internet and be provided as downloaded via the network, or may be provided or distributed via a network such as the Internet.

The program executed in the image forming apparatus 1 of the embodiment is configured as modules including the above-described units (i.e., the correction value acquiring unit 131, the pattern processing unit 132, the anomaly determining unit 133, the image density acquiring unit 134, and the correction value calculating unit 135). In an actual hardware configuration, the CPU 30 (an example of a processor) reads and executes the program from the ROM 31. Thereby, the correction value acquiring unit 131, the pattern processing unit 132, the anomaly determining unit 133, the image density acquiring unit 134, and the correction value calculating unit 135 are loaded and generated in a main memory.

In the above-described embodiment of the present invention, the image forming apparatus 1 is applied to a multi-function peripheral with at least two functions out of the copier function, the printer function, the scanner function, and the FAX function. The image forming apparatus 1, however, is also applicable to any other type of image forming apparatus such as a copier, a printer, a scanner, or a FAX machine, for example.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An image forming apparatus comprising:
   a reading table;
   an image reading device configured to read a pattern formed on a recording medium on the reading table and generate image data of the pattern;
   an image forming device including an exposure device, the exposure device including a light emitting element that irradiates a surface of a photoconductor with light to form an electrostatic latent image on the surface of the photoconductor, the image forming device being configured to form the pattern on the recording medium based on the electrostatic latent image; and
   circuitry configured to, based on a first correction value and a second correction value, calculate a third correction value to correct a light amount of the light emitting element, the first correction value being previously set to correct the light amount of the light emitting element, and the second correction value being calculated based on density data of the image data to correct the light amount of the light emitting element,
   the exposure device further including an element driving device that drives the light emitting element in accordance with the third correction value, and
   the circuitry
      setting at least two or more determination areas in each of a white area and a density acquisition pattern area of the recording medium, and
      prior to calculating the third correction value, determining presence or absence of a rise of the recording medium from the reading table based on the density data of the image data in the at least two or more determination areas.

2. The image forming apparatus of claim 1, wherein the circuitry determines the presence or absence of the rise of the recording medium from the reading table based on
   a result of comparison between a first threshold value and an absolute value of a difference in the density data between a plurality of determination areas of the at least two or more determination areas in the white area,
   a result of comparison between a second threshold value and the density data of each determination area of the at least two or more determination areas in the white area,
   a result of comparison between a third threshold value and an absolute value of a difference in the density data between a plurality of determination areas of the at least two or more determination areas in the density acquisition pattern area, and
   a result of comparison between a fourth threshold value and the density data of each determination area of the at least two or more determination areas in the density acquisition pattern area.

3. The image forming apparatus of claim 1, wherein when the at least two or more determination areas set in the density acquisition pattern area are four or more determination areas, the circuitry sets the four or more determination areas in the density acquisition pattern area, with at least two determination areas of the four or more determination areas in the density acquisition pattern area being included in each of two opposing edge portions of the recording medium.

4. The image forming apparatus of claim 1, wherein when the at least two or more determination areas set in the density acquisition pattern area are four or more determination areas, the circuitry sets 4+2n determination areas in the density acquisition pattern area, n representing an integer equal to or greater than zero.

5. The image forming apparatus of claim 1, wherein the circuitry controls the image forming device to move a position of the density acquisition pattern area formed on the recording medium.

6. The image forming apparatus of claim 1, wherein the image forming device further includes
the photoconductor,
a charging device configured to charge the surface of the photoconductor,
a developing device configured to adhere toner to the electrostatic latent image to form a toner image,
a transfer device configured to transfer the toner image to the recording medium, and
a fixing device configured to fix the toner image on the recording medium,
wherein the exposure device further includes a memory configured to store the third correction value, and
wherein the element driving device reads the third correction value from the memory.

7. An image forming apparatus comprising:
a reading table;
image reading means for reading a pattern formed on a recording medium on the reading table and generating image data of the pattern;
image forming means for forming the pattern on the recording medium based on an electrostatic latent image, the image forming means including exposure means, the exposure means including light emitting means for irradiating a surface of a photoconductor with light to form the electrostatic latent image on the surface of the photoconductor; and
control means for, based on a first correction value and a second correction value, calculating a third correction value to correct a light amount of the light emitting means, the first correction value being previously set to correct the light amount of the light emitting means, and the second correction value being calculated based on density data of the image data to correct the light amount of the light emitting means,
the exposure means further including element driving means for driving the light emitting means in accordance with the third correction value, and
the control means
setting at least two or more determination areas in each of a white area and a density acquisition pattern area of the recording medium, and
prior to calculating the third correction value, determining presence or absence of a rise of the recording medium from the reading table based on the density data of the image data in the at least two or more determination areas.

8. The image forming apparatus of claim 7, wherein the control means determines the presence or absence of the rise of the recording medium from the reading table based on
a result of comparison between a first threshold value and an absolute value of a difference in the density data between a plurality of determination areas of the at least two or more determination areas in the white area,
a result of comparison between a second threshold value and the density data of each determination area of the at least two or more determination areas in the white area,
a result of comparison between a third threshold value and an absolute value of a difference in the density data between a plurality of determination areas of the at least two or more determination areas in the density acquisition pattern area, and
a result of comparison between a fourth threshold value and the density data of each determination area of the at least two or more determination areas in the density acquisition pattern area.

9. The image forming apparatus of claim 7, wherein when the at least two or more determination areas set in the density acquisition pattern area are four or more determination areas, the control means sets the four or more determination areas in the density acquisition pattern area, with at least two determination areas of the four or more determination areas in the density acquisition pattern area being included in each of two opposing edge portions of the recording medium.

10. The image forming apparatus of claim 7, wherein when the at least two or more determination areas set in the density acquisition pattern area are four or more determination areas, the control means sets 4+2n determination areas in the density acquisition pattern area, n representing an integer equal to or greater than zero.

11. The image forming apparatus of claim 7, wherein the control means controls the image forming means to move a position of the density acquisition pattern area formed on the recording medium.

12. The image forming apparatus of claim 7, wherein the image forming means further includes
the photoconductor,
charging means for charging the surface of the photoconductor,
developing means for adhering toner to the electrostatic latent image to form a toner image,
transferring means for transferring the toner image to the recording medium, and
fixing means for fixing the toner image on the recording medium,
wherein the exposure means further includes storage means for storing the third correction value, and
wherein the element driving means reads the third correction value from the storage means.

13. A method of detecting a rise of a recording medium, performed by an image forming apparatus, the image forming apparatus including a reading table and an exposure device, the exposure device including a light emitting element, the method comprising:
with the exposure device, forming a pattern on a recording medium based on an electrostatic latent image;
reading the pattern formed on the recording medium on the reading table and generating image data of the pattern;
determining presence or absence of a rise of the recording medium from the reading table based on density data of the image data in at least two or more determination areas, the at least two or more determination areas having been set in each of a white area and a density acquisition pattern area of the recording medium;
based on a first correction value and a second correction value, calculating a third correction value to correct a light amount of the light emitting element, the first correction value being previously set to correct the light amount of the light emitting element, and the second correction value being calculated based on the density data of the image data to correct the light amount of the light emitting element; and with the exposure device, driving the light emitting element in accordance with the third correction value.

* * * * *